US012561630B2

(12) United States Patent
Bezrukov

(10) Patent No.: US 12,561,630 B2
(45) Date of Patent: Feb. 24, 2026

(54) METHOD OF PARTIAL VALIDATION OF AN ORGANIZATIONAL STRUCTURE

(71) Applicant: SAP SE, Walldorf (DE)

(72) Inventor: Vladislav Bezrukov, Walldorf (DE)

(73) Assignee: SAP SE, Walldorf (DE)

( * ) Notice: Subject to any disclaimer, the term of this patent is extended or adjusted under 35 U.S.C. 154(b) by 302 days.

(21) Appl. No.: 17/944,064

(22) Filed: Sep. 13, 2022

(65) Prior Publication Data

US 2024/0086810 A1     Mar. 14, 2024

(51) Int. Cl.
| | |
|---|---|
| *G06Q 10/06* | (2023.01) |
| *G06F 3/0482* | (2013.01) |
| *G06Q 10/0631* | (2023.01) |
| *G06Q 10/0633* | (2023.01) |

(52) U.S. Cl.
CPC ..... *G06Q 10/06316* (2013.01); *G06F 3/0482* (2013.01); *G06Q 10/0633* (2013.01)

(58) Field of Classification Search
CPC ....................................................... G06Q 10/06
See application file for complete search history.

(56) References Cited

U.S. PATENT DOCUMENTS

| | | | | |
|---|---|---|---|---|
| 7,089,530 B1 * | 8/2006 | Dardinski | .............. | G05B 15/02 |
| | | | | 717/109 |
| 7,272,815 B1 * | 9/2007 | Eldridge | .................. | G06F 8/71 |
| | | | | 717/109 |

| | | | | |
|---|---|---|---|---|
| 7,890,927 B2 * | 2/2011 | Eldridge | ................ | G05B 15/02 |
| | | | | 700/86 |
| 7,958,147 B1 * | 6/2011 | Turner | .................... | G06Q 10/10 |
| | | | | 707/694 |
| 9,710,836 B1 * | 7/2017 | O'Malley | .......... | G06Q 30/0607 |
| 10,540,502 B1 * | 1/2020 | Joyce | .................... | G06F 21/552 |
| 10,567,364 B2 * | 2/2020 | Vats | ........................ | H04L 63/08 |
| 11,663,396 B2 * | 5/2023 | Vagell | .................. | G06F 40/166 |
| | | | | 715/256 |
| 12,094,018 B1 * | 9/2024 | O'Malley | ............ | G06Q 50/184 |
| 2006/0248577 A1 * | 11/2006 | Beghian | .................. | G06F 21/41 |
| | | | | 726/5 |
| 2008/0177782 A1 * | 7/2008 | Shalit | .................... | G06F 40/197 |
| | | | | 707/999.102 |

(Continued)

FOREIGN PATENT DOCUMENTS

| | | | | | |
|---|---|---|---|---|---|
| CA | 2371703 A1 | * | 11/2000 | ............. | G06Q 40/08 |

*Primary Examiner* — Kurtis Gills
(74) *Attorney, Agent, or Firm* — Fountainhead Law Group, PC

(57) ABSTRACT

Computer-readable media, methods, and systems are disclosed for performing a method for partial validation of a tree-like hierarchy structure. A method includes selecting a first portion of the hierarchy structure to edit, updating a status associated with the first portion to a draft mode status, modifying the first portion to create an edited first portion, and executing a first validation process on the edited first portion to determine if the edited first portion is consistent with a plurality of rules of the hierarchy structure. If the edited first portion is inconsistent with at least one of the plurality of rules, the method includes displaying an error message and/or a warning message to a user on a user interface. If the edited first portion is consistent with the plurality of rules, the method includes updating a status associated with the edited first portion to an active mode status.

15 Claims, 9 Drawing Sheets

(56)     References Cited

U.S. PATENT DOCUMENTS

| | | | |
|---|---|---|---|
| 2009/0199090 A1* | 8/2009 | Poston ................. | G06F 16/907 |
| | | | 707/999.102 |
| 2012/0096389 A1* | 4/2012 | Flam .................... | G06F 16/168 |
| | | | 715/777 |
| 2023/0055241 A1* | 2/2023 | Zionpour ............. | G06F 40/186 |

* cited by examiner

300

Task List

| Folder | Organizational Unit Type | Edit | Responsible User Type | User Responsible |
|---|---|---|---|---|
| vb-test | Client | | User | |
| Backend-odata | Communication System | | User | |
| Area 1 | Controlling Area | Draft | User | |
| Company 1 | Company Code | | User | |
| Company 2 | Company Code | | User | |
| Plant 0001 | Plant | | User | |
| Plant 0002 | Plant | | User | |
| Plant 0003 | Plant | | User | |
| Plant 0004 | Plant | | User | |
| Company 3 | Company Code | | User | |
| Company 4 | Company Code | | User | |
| Company 5 | Company Code | | User | |
| Company 6 | Company Code | | User | |
| | | | | |
| | | | | |

METHOD OF PARTIAL VALIDATION OF AN ORGANIZATIONAL STRUCTURE

TECHNICAL FIELD

Embodiments generally relate to methods and systems of validation of an organizational structure, and more particularly to partial validation of a tree-like hierarchy structure.

In many organizational environments, a process may include many tasks and sub-tasks. These tasks may be semantically grouped into hierarchies, which may be represented as a tree-like structure. The multiple nodes of the tree may have a structural or a content meaning (folders and tasks respectively). For example, in accounting, a closing process (such as for example, advanced financial closing (AFC)) may consist of many tasks.

When a user wishes to change the hierarchy structure, this should be done in a consistent way. Any changes may be removed from execution until they are activated or placed in an active mode. This may be achieved by a draft concept. Using a draft concept, a part of the structure that is being edited (such as in a draft mode status) can contain inconsistent data that does not affect the overall execution process.

However, the entire tree structure may contain many thousands of tasks and hundreds of folders. Considering all of the tasks and folders as a single draft is expensive, as it requires the system to maintain a copy of the entire tree in both the active mode and the draft mode. Thus, an activation process, including validation of the draft version, may take an unacceptably long time, even for small changes, e.g., changing a single attribute of one task.

SUMMARY

Disclosed embodiments address the above-mentioned problems by providing one or more non-transitory computer-readable media storing computer-executable instructions that, when executed by a processor, perform a method for partial validation of a hierarchy tree structure.

In some aspects, the techniques described herein relate to one or more non-transitory computer-readable media storing computer-executable instructions that, when executed by a processor, perform a method for partial validation of a tree-like hierarchy structure, the method including: selecting a first portion of the hierarchy structure to edit; updating a status associated with the first portion to a draft mode status; modifying the first portion to create an edited first portion; executing a first validation process on the edited first portion to determine if the edited first portion is consistent with a plurality of rules of the hierarchy structure; in response to determining that the edited first portion is inconsistent with at least one of the plurality of rules, displaying an error message and/or a warning message to a user on a user interface; and in response to determining that the edited first portion is consistent with the plurality of rules, updating a status associated with the first portion to an active mode status.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein:

FIG. 3 shows an exemplary user interface of a hierarchy tree structure;

Figure 1:
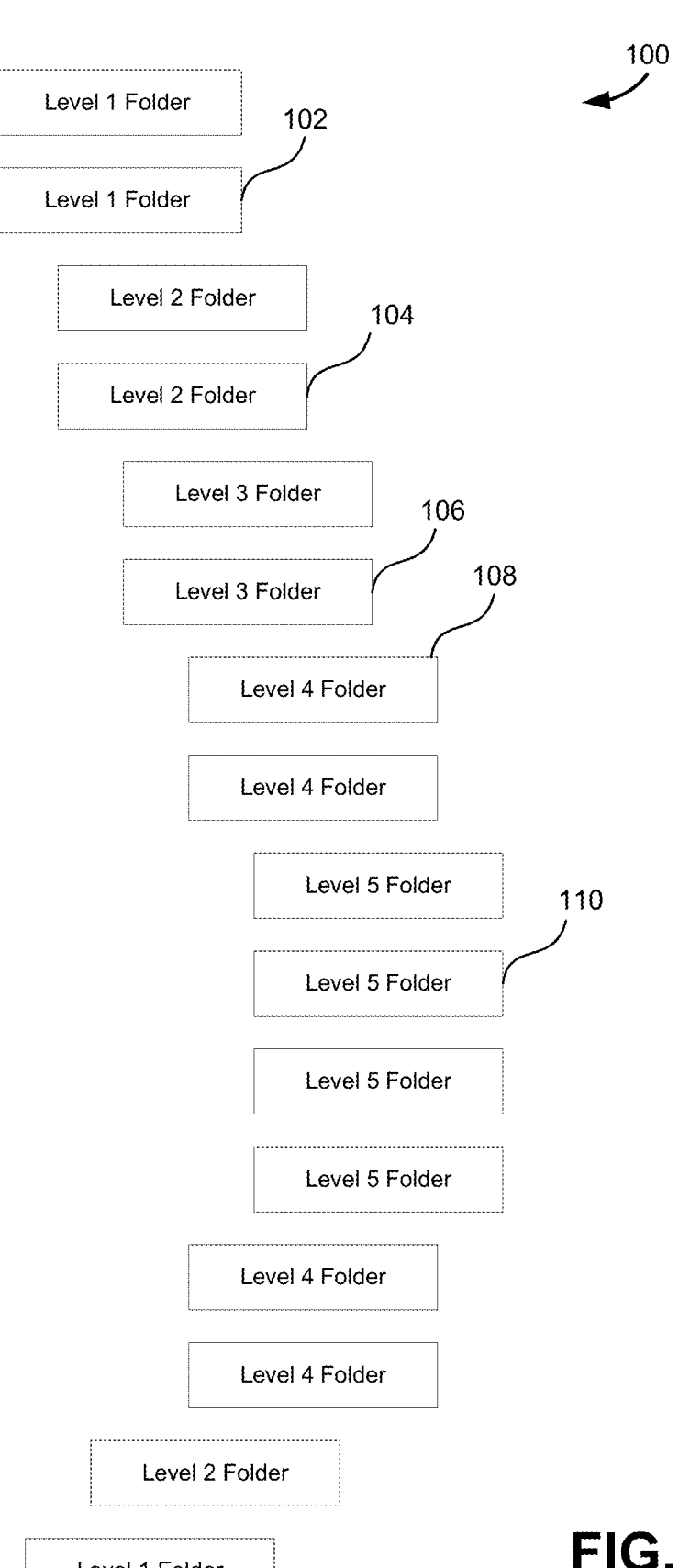
FIG. 1 shows an organizational hierarchy tree structure having multiple levels.

The drawing figures do not limit the present teachings to the specific embodiments disclosed and described herein. The drawings are not necessarily to scale, emphasis instead being placed upon clearly illustrating the principles of the disclosure.

DETAILED DESCRIPTION

Systems consistent with the present teachings allow for partial drafts, where the organizational tree may contain multiple drafts on different levels. In an embodiment, the size of the draft may be a single folder with all its underlying tasks (but without subfolders). An activation process may include various validation aspects to prevent inconsistent data in a subsequent execution process. In some embodiments, a validation process ensures that the entire tree is valid after activation. In such embodiments, the system checks the values within the draft itself and also checks the draft in the context of the entire tree.

FIG. 1 shows an example organizational hierarchy tree structure having multiple levels. A hierarchy tree structure contains different nodes, which may be folders. Each level of folders may have numerous folders and additional levels within. Each folder may include a number of tasks, which may be hundreds or thousands of tasks. In some embodiments, there may be 5 levels, although more or less levels are possible. In an embodiment, the level 1 folder 102 may represent a client, the level 2 folder 104 may represent a communication system, the level 3 folder 106 may represent a controlling area, the level 4 folder 108 may represent a company code, and the level 5 folder 110 may represent a plant.

A user may wish to edit a tree structure at one or more levels. In order for a user to edit a hierarchy structure, a user may choose a portion of the tree structure to edit. Previously, in order to change one attribute of a node, the entire tree structure would need to be placed in edit/draft mode, copied, and re-saved before being activated. In order to make the editing process easier and faster, in some embodiments, a single folder may be placed in a draft mode without placing the entire tree structure in draft mode. Thereby a user may be able to edit and/or activate just one folder at a time. In some embodiments, multiple folders may be edited at the same time.

However, the larger tree structure should be able to be activated in multiple instances. In a first embodiment, a draft of one or more folders can be activated even if the result is that the entire tree is invalid. This may be called a "partial validation process." In such embodiments, the system may allow for activation of a sub-object, such as folder 108, even when the entire structure, such as tree structure 100, is invalid.

In a second embodiment, the validation process will return errors only regarding the objects in the draft mode. This could be determined by executing a validation process at least twice. The first validation would be with the active tree without the draft, and the second validation would be with the active tree including the draft. The system could then compare the first validation and the second validation to determine the number of errors caused by the draft itself. If no difference was identified, the draft could be considered valid and then activated. However, this embodiment would require at least two complete validation runs.

In a third embodiment discussed further herein, the validation process associates each validation error with the root cause objects. A validation error can be classified as either an error or as a warning. An error generally must be resolved before activation/validation can proceed. However, a warning may be ignored and corrected later if necessary but does not prevent the validation process from proceeding.

Prior methods have imposed validation problems for error constellations going beyond a single draft. For example, the tree may contain an organizational structure, such as tree structure 100, represented by folders, such as 102, 104, 106, 108, 110. An example of such an orgunit tree is presented here:

Controlling Area (CA)→Company Code (CC)→Plant (PL)

In such an example, CA may be represented by level 3 folder 106, CC may be represented by level 4 folder 108, and PL may be represented by level 5 folder 110. The hierarchy order is implied by the requirements and needs to be validated to avoid invalid structures like:

Company Code CC→Controlling Area CA→Plant PL
or
Plant PL→Company Code CC→Controlling Area CA, etc.

Thus, level 4 folder 108 may not be moved above the level 3 folder 106. Also, level 5 folder 110 could not be moved above the level 4 folder 108 or the level 3 folder 106.

Another example of a tree validation problem is derived from the fact that a single Orgunit Folder (e.g. Company Code CC) may contain multiple orgunit assignments. For example, the Company Codes 1010 and 1020 can be assigned to the same Company Code Folder CC, such as level 4 folder 108. The same applies to CA and PL folders (level 3 folder 106, level 5 folder 110)—they also can contain multiple assignments.

However, not every combination of such orgunit structure is valid. For example, CC (1010, 1020) should not contain PL with multiple assignments, e.g., PL (1000, 2000), because not all possible combinations are valid from the organizational structure point of view:

CC (1010)→PL (1000)
CC (1010)→PL (2000)
CC (1020)→PL (1000)
CC (1020)→PL (2000)

To avoid such uncertainty, the system may prohibit such a combination of many-to-many orgunit assignments. Thus, the draft mode needs to perform a validation not just of the single node CC (1010, 1020) but also to validate the entire tree, including the subfolder PL. If the combination of a draft and an entire corresponding tree results in a valid tree, the draft of CC folder can be activated. This should result in the validity of the entire execution tree. If the active state of the tree is consistent, this approach works. Thus, if the validation of a draft fails, it can be determined that the root cause of the error is in the draft, and the draft should be fixed before getting activated.

However, this approach may not be feasible in some situations when the active version is already invalid. This may happen in a situation where there are two versions of the application used to create the tree structure 100. For example, a first version of the application (AppV1) may have been used to initially create a hierarchy structure 100. The system may be upgraded to a second version of the application, (AppV2) after the creation of the tree structure 100. In an example, AppV1 may not have implemented restrictions concerning the problem of multiple orgunit combination. So, AppV1 can create and activate the tree structure:

Controlling Area CA (CA1, CA2)→
Company Code CC (1010,1020)→
Plant PL (1000,2000)

However, in the AppV2, this structure may be invalid, due to combinatoric restrictions. In the AppV2, setting all the three folders (CA, CC, or PL) to a draft status and modifying them, cannot solve the problem in one step. Changing the CA folder, the CC→PL combination is still invalid, thus failing the validation run over the entire tree. Validation run fails: CA (active)→CC (draft)→PL (active). Changing the PL folder, the CA→CC combination is still invalid, thus again failing the validation run over the entire tree. Validation run fails: CA (active)→CC (active)→PL (draft). So, the validation of the entire tree prevents changing any of the sub-folders, because of the errors outside the draft sub-folder itself.

In order to prepare for the transition from AppV1 to AppV2, an improved solution is needed. An embodiment presented herein thus presents an improved partial validation process that allows activation of one single folder even if the entire structure is still invalid, while still identifying and preventing errors caused by the draft folder itself.

Figure 2:
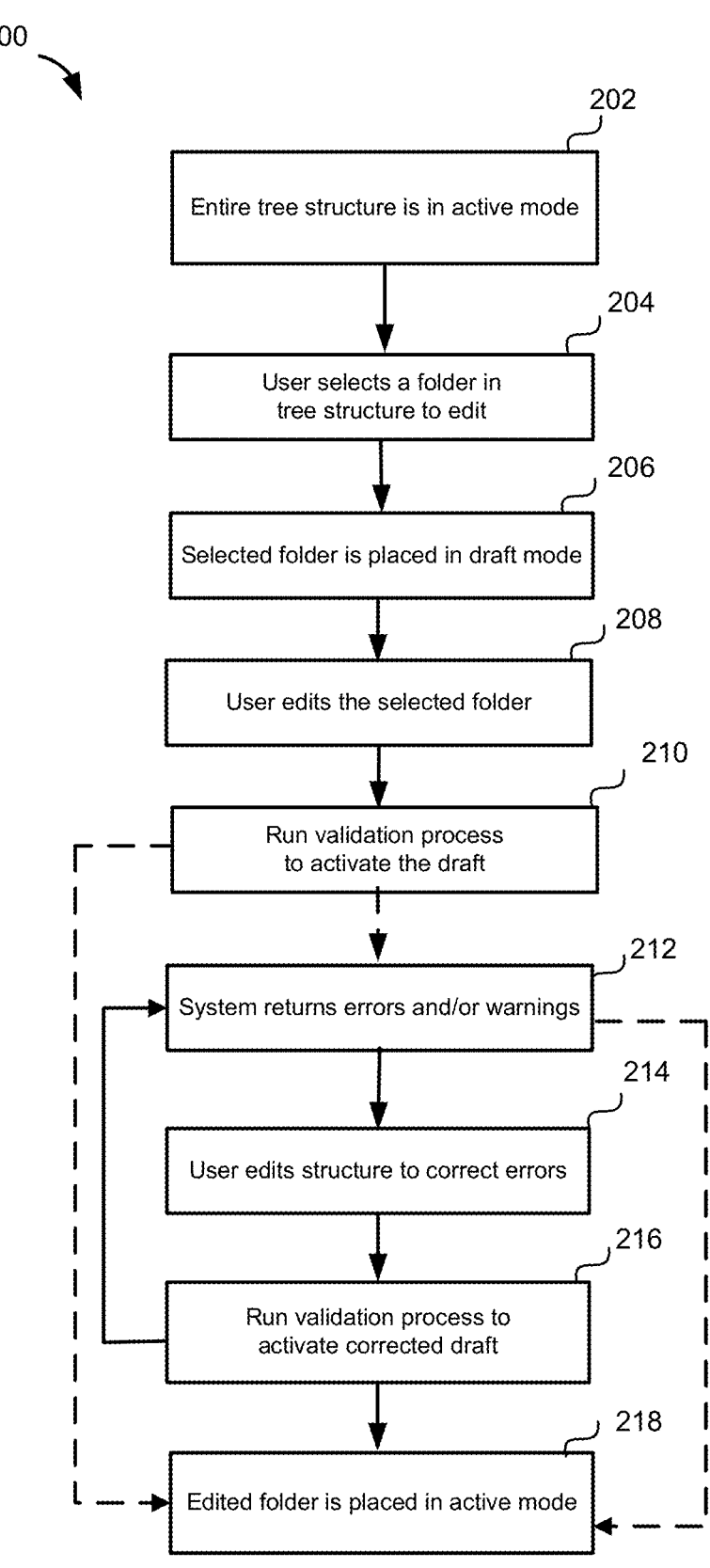
FIG. 2 shows a flow chart of a process for editing and activating a hierarchy tree structure.

FIG. 2 shows a flow chart of an exemplary process 200 for editing and activating a hierarchy tree structure, such as tree structure 100. In one example, a hierarchy tree 100 is created. In some embodiments, the tree may be created using a first version (V1) of an application. In some embodiments, a user may create the tree structure such as by entering inputs into a user interface of an application of a computer system. The tree structure 100 may be: Level 1 (Client)→Level 2 (Communications System)→Level 3 (Controlling Area)→Level 4 (Company Code)→Level 5 (Plant), as seen in FIG. 1 and FIG. 3. In one example, the tree structure 100 created may include:

Controlling Area CA (CA1, CA2)→
Company Code CC (1010, 1020)→
Plant PL (1000, 2000)

Although this tree structure is used as an example, any tree structure may be created by the system and/or the user. Multiple folders/nodes of the tree structure may be provided.

Each node may represent a folder or a task, and hundreds or thousands of nodes may be present in an entire tree structure.

In FIG. 2, at step 202, hierarchy tree structure 100 is initially in an active mode status. In some embodiments, the tree structure may be activated or placed into an active status by a user or system input. A sample user interface 300 showing a tree structure 100 is illustrated in FIG. 3. User interface 300 may include a plurality of columns that each may include multiple forms of data. A first column 302 may include a list of folders, similar to the folder hierarchy shown in FIG. 1. A second column 304 may include a type of folder, such as an organizational unit type, which may indicate the level of the folder. A third column 306 may indicate a status 312 of each folder, such as draft mode or active mode. Additional status indicators are contemplated. A fourth column 308 and a fifth column 310 may include additional data, such as the user type or the responsible user. The columns may include any type of data as desired. The format and number of columns is merely exemplary and more or fewer may be provided. A different form or format of a user interface may be provided. In an embodiment, the user interface allows the user to edit the folder structure at one particular level at a time.

Figure 4:
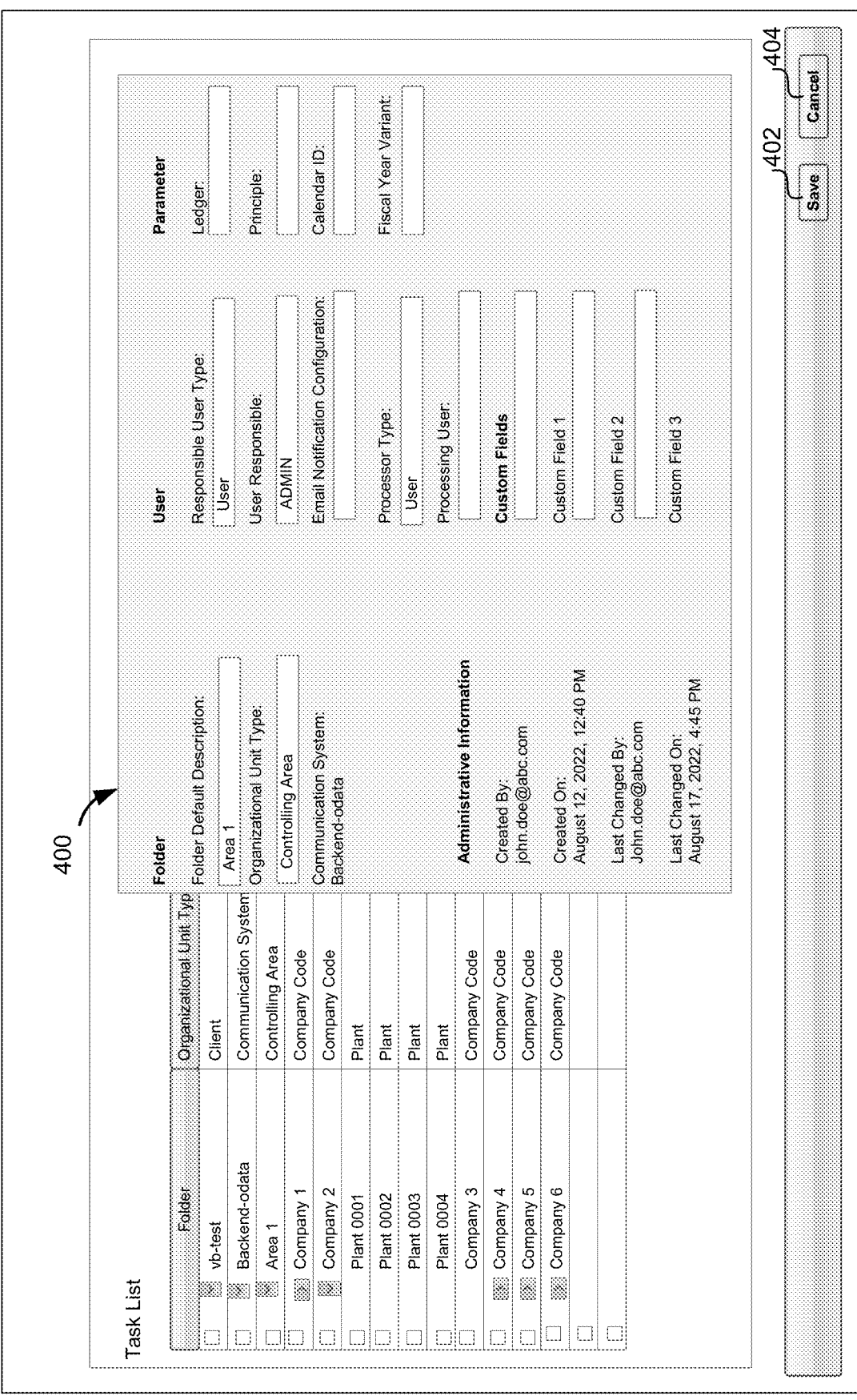
FIG. 4 shows an exemplary user interface edit window of a level three folder.

In FIG. 2, at step 204, a level such as a level 3 folder 106, of the tree structure 100 is selected to edit. In some embodiments, a user may select the level/folder to edit. At step 206, the status of this selected level/folder is updated to a draft mode status. While a folder is being edited, such as by a user, the user interface may indicate that the particular folder is in "draft" mode, as seen in FIG. 3 by status 312. Another user or system may be able to view this status 312 to inform other users that a particular folder is being edited. In some embodiments, when a folder is selected, a separate window, such as a pop-up window, is presented to the user in a user interface to allow the user to edit the data. An exemplary edit window 400 is shown in FIG. 4. At step 208, a user edits the selected folder. Editing may include changing one or more tasks, attributes, or preferences within the folder. For example, the user may edit a level 3 folder 106, such as Controlling Area CA (CA1, CA2), thereby placing this folder in draft mode, such as shown in FIG. 4.

As shown in FIGS. 4-8, user interface 300 may include a number of action buttons, such as a "save" button 402 and a "cancel" button 404. When a user clicks on "save" button 402, the changes made in the edit window 400 are saved, as indicated by a notification, such as the "draft saved" notification 502, in the user interface 300. If a user clicks on "cancel" button 404, the changes will not be saved and the edits will be cancelled.

At step 210, after a user clicks "save" button 402, a validation process is run to update the status associated with the selected folder to the active mode. The validation process may include checking the folder itself and any data within the folder against a plurality of rules relating to the tree structure. At optional step 212, the system returns at least one error message and/or at least one warning message. The error message and/or warning message may be presented to the user in a user interface detail window on a client device, as will be further described herein.

Figure 5:
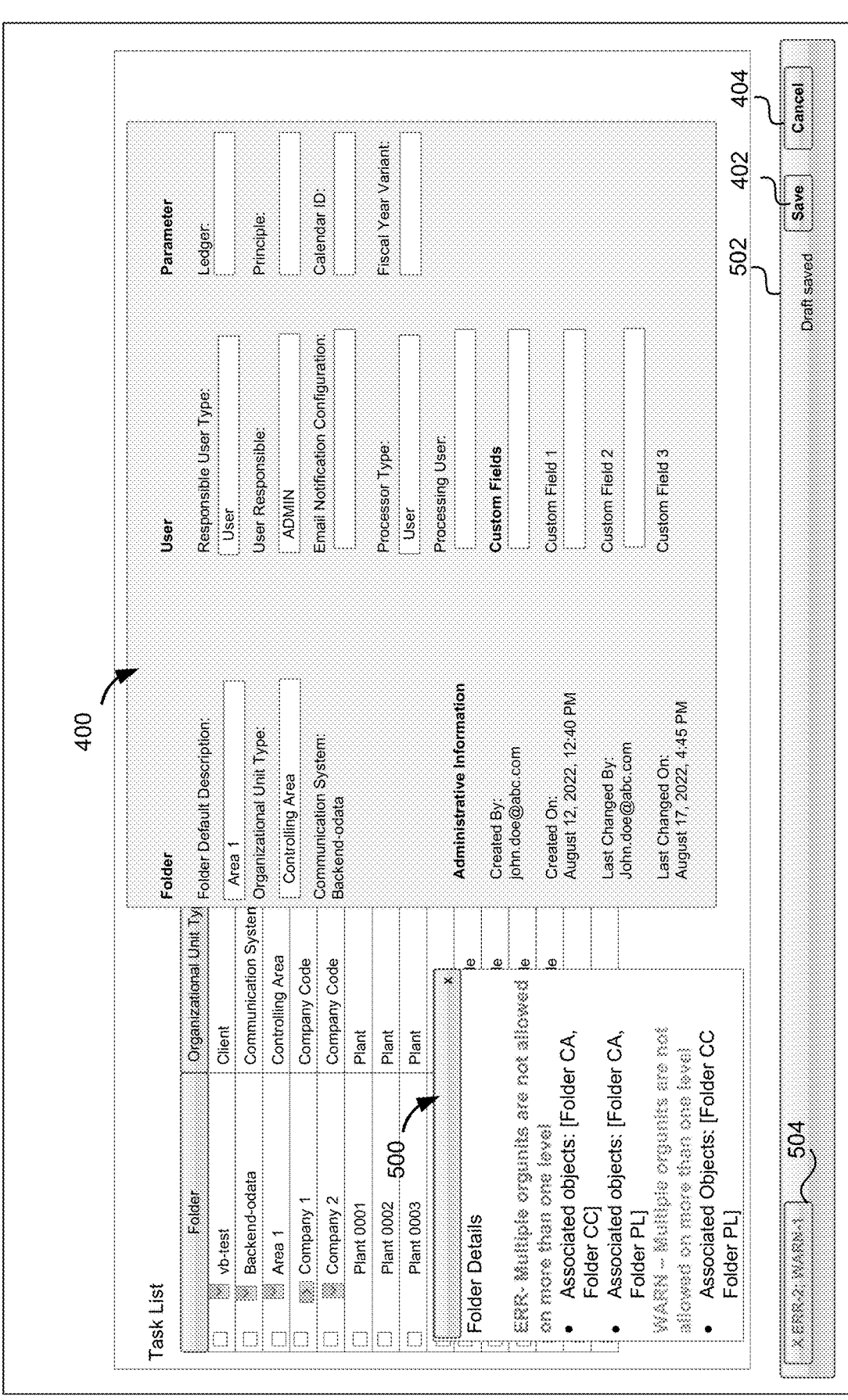
FIG. 5 shows an exemplary user interface edit window of a level three folder and an exemplary user interface detail window for displaying error and/or warning messages.

Exemplary messages are shown in FIG. 5. A first notification 504 may be shown to the user in user interface 300. First notification 504 may include the number of errors and/or the number of warnings that were found by the system when the validation process was initiated. For example, notification 504 may show "ERR-2" and "WARN-1", to indicate there are 2 errors and 1 warning message. To see the details of these errors and warnings, a user may click on this notification 504 to display an exemplary detail window 500.

Figure 8:
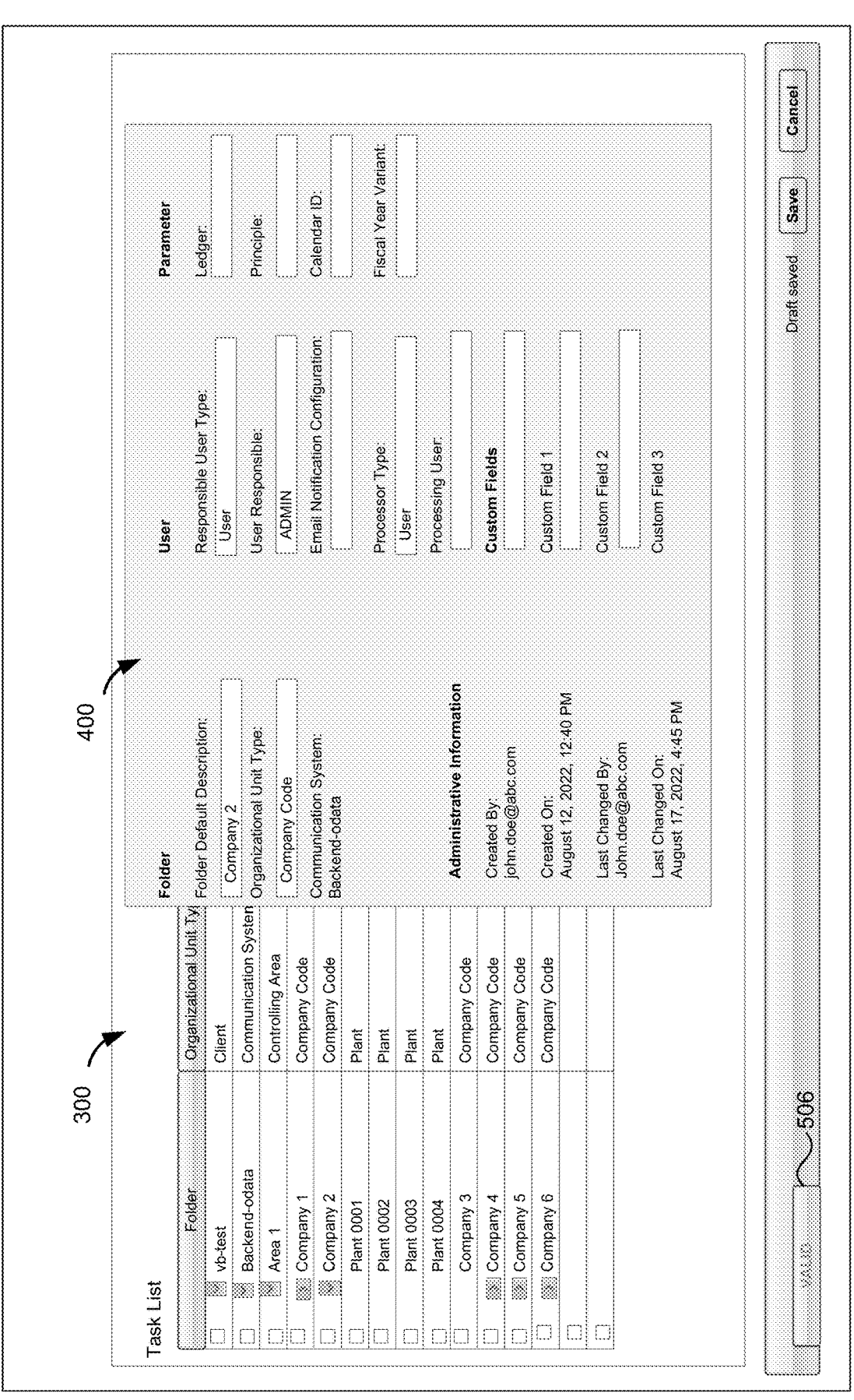
FIG. 8 shows an exemplary user interface edit window when there are no error messages or warning messages.

Although one example of a notification is shown herein, any type of visual, audio, tactile, or graphical notification may be provided to the user. The notification to the user must be capable of distinguishing between an error message and a warning message. For example, an error message may be displayed in one color (such as red) and warning message may be displayed in another color (such as blue). In some embodiments, a notification of no errors or warnings may be presented to the user. For example, an approval message 506 may be displayed on the user interface in a third color (such as green), as seen in FIG. 8.

In an example, the validation process may determine that multiple orgunits are not allowed on more than one level. Thus, the following error messages and warning messages may be provided, as seen in exemplary detail window 500:

[ERR] Multiple orgunits are not allowed on more than one
      level
      Associated objects: [Folder CA, Folder CC]
    [ERR] Multiple orgunits are not allowed on more than one
      level
      Associated objects: [Folder CA, Folder PL]
    [WARN] Multiple orgunits are not allowed on more than
      one level
      Associated objects: [Folder CC, Folder PL]

At step 214, user edits the selected folder to correct the errors. In one example, the user can edit the CA folder to remove CA2 and change the structure to:

Controlling Area CA (CA1)→
    Company Code CC (1010, 1020)→
    Plant PL (1000, 2000)

The validation process cannot proceed if any error messages remain. If there are no errors or warnings found during the validation process, the process 200 can proceed directly to step 218 and the folder/level status can be changed to the active mode. At step 216, a validation process is run again to place the corrected folder in the active mode. In an example, once the CA folder is updated to remove CA2, this will remove the two prior error messages and only the following warning message will remain, as seen in FIG. 6:

[WARN] Multiple orgunits are not allowed on more than
      one level
      Associated objects: [Folder CC, Folder PL]

Figure 6:
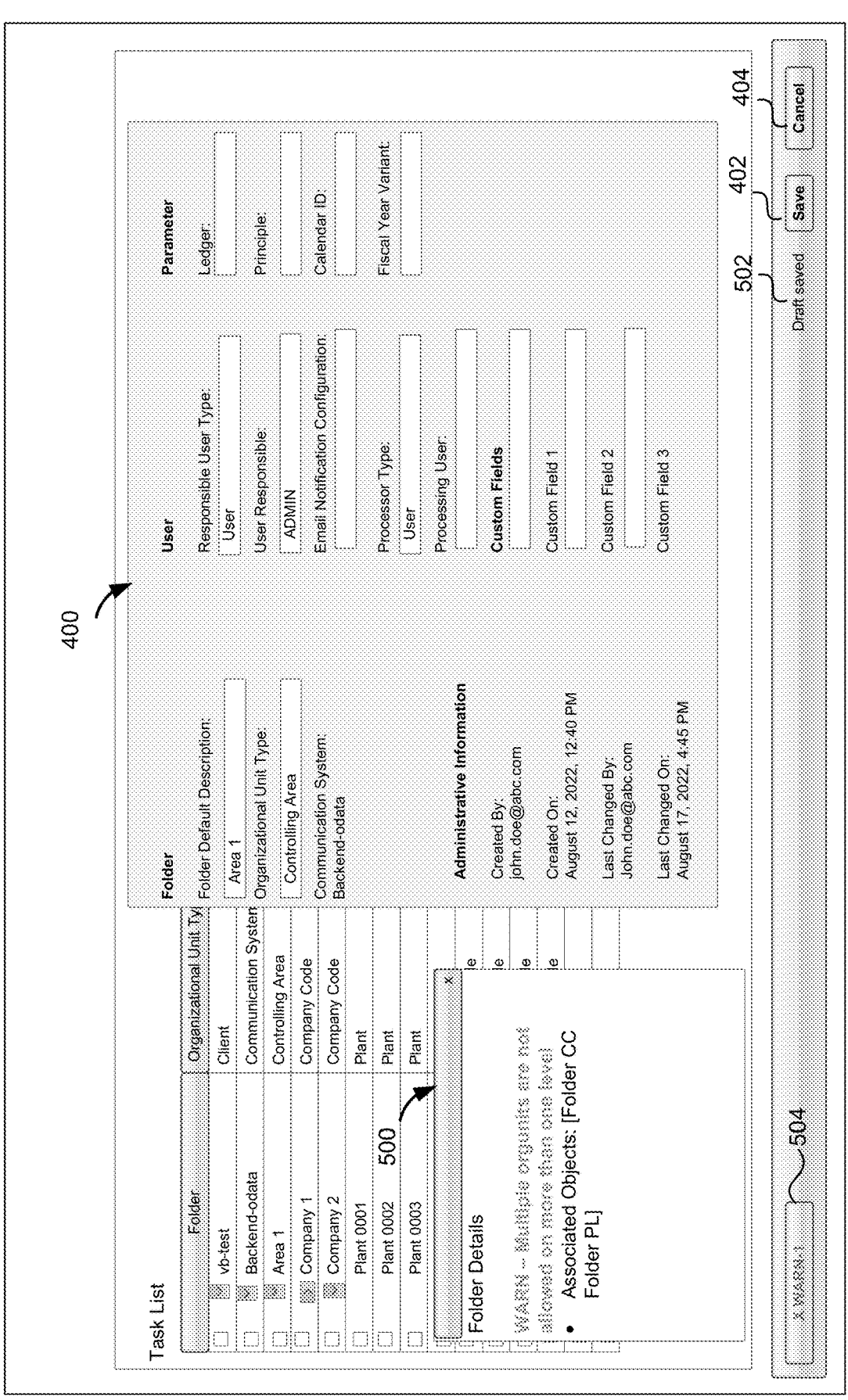
FIG. 6 shows an exemplary user interface edit window of a level three folder and an exemplary user interface detail window displaying a warning message.

The process may proceed to step 212 to return error messages and/or warning messages to the user, as seen in window 500 in FIG. 6. If only warnings remain or there are no errors or warnings remaining, the process proceeds to step 218, and the level is activated. In some embodiments, the process may proceed directly from step 210 to step 218 if there are no error messages or warning messages. Thus, only error messages will prevent the activation of the folder and the entire tree 100. Warning messages are provided to a user for informational purposes but will not prevent the tree structure 100 from being placed into the active mode. A user can choose to ignore a warning message and proceed.

Figure 7:
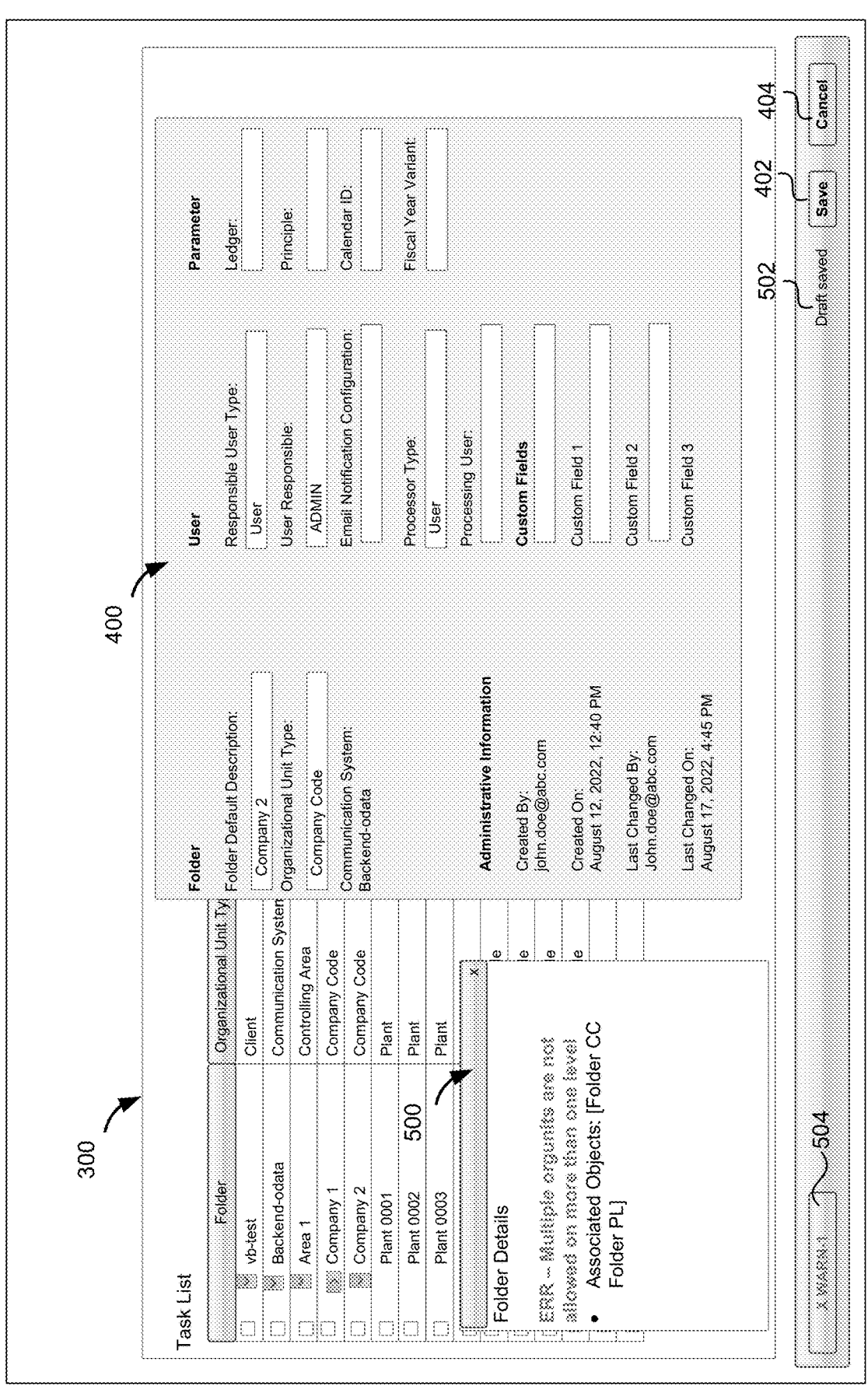
FIG. 7 shows an exemplary user interface edit window of a level four folder and an exemplary user interface detail window displaying an error message.

The process 200 may then repeat (as many times as necessary or desired) and the user can select another different folder to edit. For example, at step 204, a user selects a level, such as a level four folder 108, of the tree structure 100 to edit, such as shown in FIG. 7. At step 206, this selected level/folder is placed in a draft mode. At step 208, a user edits the selected folder. Editing may include changing one or more tasks, attributes, or preferences within the folder.

For example, the user may edit a level four folder 108, such as Company Code CC (1010, 1020), thereby placing this folder in draft mode.

At step 210, a validation process is executed to place the selected folder in the active mode. At optional step 212, the system returns at least one error message and/or at least one warning message. The error message and/or warning message is presented to the user in a user interface on a client device, as will be further described herein.

In an example, the validation process may determine that multiple orgunits are not allowed on more than one level. Thus, the following error messages and warning messages may be provided:

[ERR] Multiple orgunits are not allowed on more than one level

Associated objects: [Folder CC, Folder PL]

It is noted that this same message was a warning message when the user was editing the CA folder (because it was an inconsistency that was outside the draft folder itself), but is now indicated as an error because the user is currently editing the CC folder. At step 214, user edits the folder to correct the error. In one example, the user can edit the CC folder to remove 1020 and change the structure to:

Controlling Area CA (CA1)→
Company Code CC (1010)→
Plant PL (1000, 2000)

At step 216, a validation process is executed again to place the corrected folder in the active mode status. In an example, once the CC folder is updated to remove 1020, this will remove the error message. Thus, the user will receive no error messages, as shown in FIG. 8. If there are no errors or warnings remaining, the process proceeds to step 218, and the level is placed in the active mode status.

As discussed above, FIG. 3 shows a sample user interface 300 of tree structure 100. User interface 300 may include a plurality of columns 302, 304, 306, 308, 310. The user interface 300 may also include a status indicator, such as status 312, to show which parts of the tree structure are in a draft mode and/or an active mode. A user can click on a particular portion of the user interface 300 to allow a user to edit one or more portions of the tree structure. For example, if a user clicks on a folder, such as level 3 folder 106, a status 312 may show "draft" and edit window 400 may open.

FIG. 4 shows such an exemplary edit window 400. Edit window may include multiple fields that allow for a user to edit information. In some embodiments, the fields may be provided as drop-down menus and/or may allow for the entering of free text. Some information may be pre-filled or automated. Editing may include changing one or more tasks, attributes, or preferences within the folder. Window 400 may also display administrative information, such as who created the folder, when it was created, when it was changed, and who it was last changed by. Interface may also include buttons 402, 404 for saving the changes and for cancelling the changes.

FIG. 5 shows a user interface 300 after a validation process has been executed with both errors and warnings. If there are any errors or warnings, this may be displayed on the user interface in a notification 504. The notification may indicate the number of errors and/or the number of warnings. More or less information may be provided in the interface. The form and content of the notification may be changed based on user preferences or system preferences/settings. Notification 504 may be presented as a clickable button. When a user clicks on the notification 504, further detailed information may be provided in the user interface, such as in a detail window 500. Alternatively, the additional information may be automatically displayed to a user.

As shown in FIGS. 5-7, detail window 500 may display the details regarding the error messages and/or the warning messages. FIG. 5 shows both error messages and warning messages in details window 500, FIG. 6 shows just a warning message in detail window 500, and FIG. 7 shows just an error message in detail window 500. The content and format of the details window may be set by a user and/or by the system.

FIG. 6 shows a user interface 300 after a validation process has been executed, with a resulting warning message. The notification 504 and the window 500 both indicate that only a warning message is provided. Since there are no error messages, the validation process may proceed as discussed above.

FIG. 7 shows a user interface 300 after a validation process has been executed, with a resulting error message. What may have been indicated as a warning message when editing one folder, may be displayed as an error message when editing a different folder. This is because the error messages are specifically associated with the folder that is currently being edited (in draft mode status) and can therefore be fixed by the current editing process.

FIG. 8 shows a user interface after a validation process has been executed with no errors or warnings. In such an embodiment, an approval message 506 may be displayed in place of the notification 504 of errors and/or warnings.

In an embodiment, the tree structure 100 may have errors based on a combination of inconsistent data on different levels. For example, as discussed above, a level 4 folder may represent a company code and a level 5 folder 110 may represent a plant. A consistent combination would be: Company Code CC (1)→Plant PL (101), where Plant 101 is part of Company 1. An inconsistent combination would be: Company Code CC (1)→Plant PL (201), wherein Plant 201 is not part of Company 1, but rather belongs organizationally to Company 2.

Looking independently at the folder for Company 1 will not yield an error since Company 1 exists. Similarly, looking independently at the folder for Plant 201 will not yield an error since Plant 201 exists. However, the inconsistent combination will generate an error when the entire tree structure 100 is validated. In order to fix this overall structure error, either of the level 4 folder or the level 5 folder can be individually corrected. Thus, either the level 5 folder 110 for Plant 201 can be changed to Plant 101, or the level 4 folder 108 for Company 1 can be changed to Company 2 to correct this consistency error. However, this consistency error will not prevent activation of another folder that is outside this inconsistency.

Figure 9:
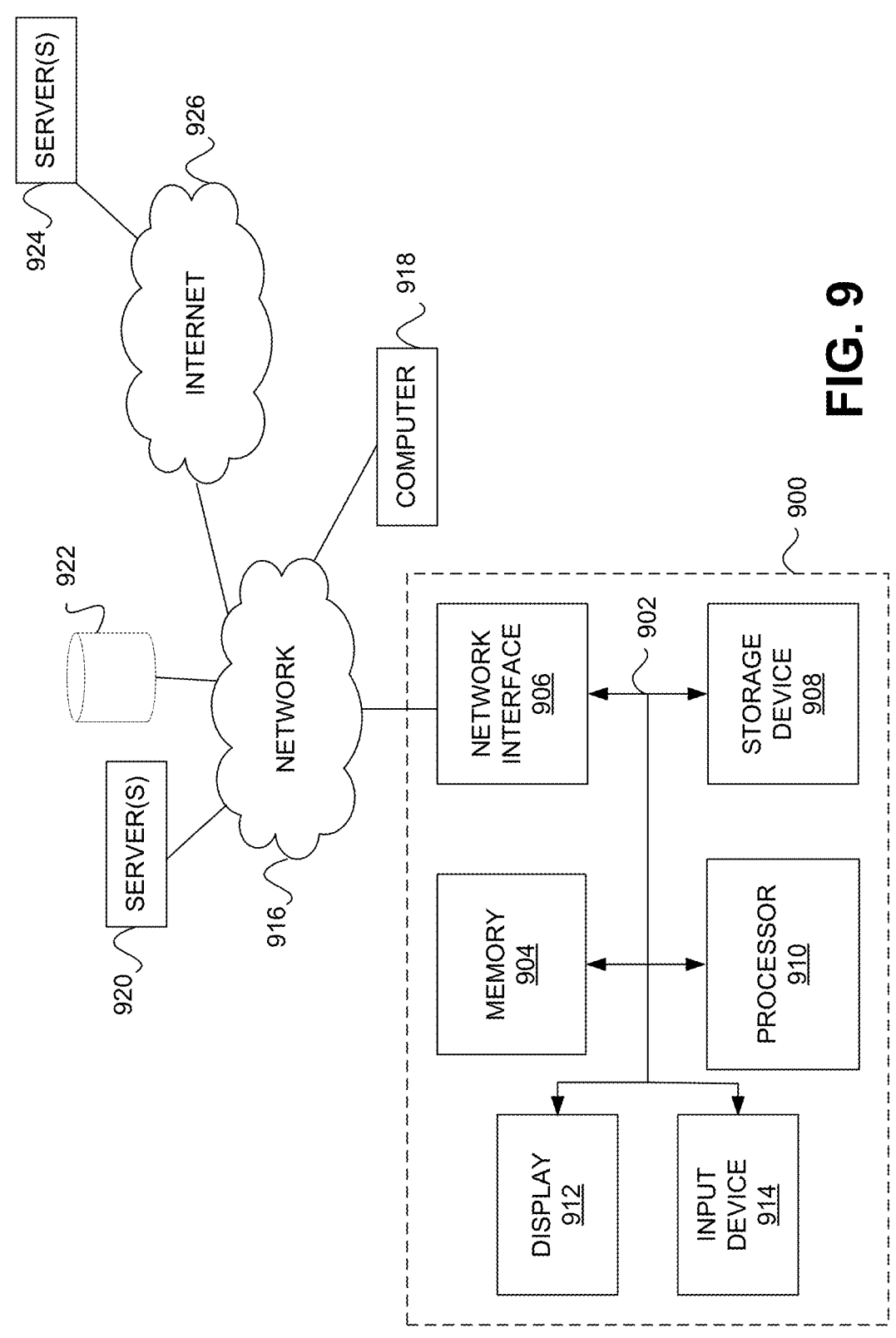
FIG. 9 is a diagram illustrating a sample computing device architecture for implementing various aspects described herein.

FIG. 9 is a diagram illustrating a sample computing device architecture for implementing various aspects described herein. Computer 900 can be a desktop computer, a laptop computer, a server computer, a mobile device such as a smartphone or tablet, or any other form factor of general- or special-purpose computing device containing at least one processor. Depicted with computer 900 are several components, for illustrative purposes. Certain components may be arranged differently or be absent. Additional components may also be present. Included in computer 900 is system bus 902, via which other components of computer 900 can communicate with each other. In certain embodiments, there may be multiple busses or components may communicate with each other directly. Connected to system bus 902 is processor 910. Also attached to system bus 902 is memory 904. Also attached to system bus 902 is display 912. In some embodiments, a graphics card providing an input to display 912 may not be a physically separate card, but rather may be integrated into a motherboard or processor 910. The graphics card may have a separate graphics-processing unit (GPU), which can be used for graphics processing or for general purpose computing (GPGPU). The graphics card may contain GPU memory. In some embodiments no display is present, while in others it is integrated into computer 900. Similarly, peripherals such as input device 914 is connected to system bus 902. Like display 912, these peripherals may be integrated into computer 900 or absent. Also connected to system bus 902 is storage device 908, which may be any form of computer-readable media, such as non-transitory computer readable media, and may be internally installed in computer 900 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 906 is also attached to system bus 902 and allows computer 900 to communicate over a network such as network 916. Network interface 906 can be any form of network interface known in the art, such as Ethernet, ATM, fiber, Bluetooth, or Wi-Fi (i.e., the Institute of Electrical and Electronics Engineers (IEEE) 802.11 family of standards). Network interface 906 connects computer 900 to network 916, which may also include one or more other computers, such as computer 918, and network storage 922, such as cloud network storage, and/or servers 922, 924. Network 916 is in turn connected to public Internet 926, which connects many networks globally. In some embodiments, computer 900 can itself be directly connected to public Internet 926.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments herein have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although described with reference to the embodiments illustrated in the attached drawing figures, it is noted that equivalents may be employed, and substitutions made herein without departing from the scope as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects in sufficient detail to enable those skilled in the art to practice them. Other embodiments can be utilized, and changes can be made without departing from the claimed scope herein. The following detailed description is, therefore, not to be taken in a limiting sense. The scope of embodiments is defined only by the appended claims, along with the full scope of equivalents to which such claims are entitled.

Having thus described various embodiments, what is claimed as new and desired to be protected by Letters Patent includes the following:

1. One or more non-transitory computer-readable media storing computer-executable instructions that, when executed by a processor, perform a method for partial validation of a tree-like hierarchy structure having multiple levels storing organizational data, the method comprising:

selecting a first portion of the tree-like hierarchy structure to edit, wherein a status of an entirety of the tree-like hierarchy structure is in an active mode status that does not allow inconsistent data;

updating a status associated with the first portion to a draft mode status that allows inconsistent data, without placing the entirety of the tree-like hierarchy structure in the draft mode status;

displaying a status indicator for the status of the first portion of the tree-like hierarchy structure in a user interface, the status indicator showing which parts of the tree-like hierarchy structure are in the draft mode status or in the active mode status;

modifying the first portion to create an edited first portion in a draft mode;

executing a first validation process on the edited first portion to determine if the edited first portion is consistent with a plurality of rules of the tree-like hierarchy structure;

in response to determining that the edited first portion is inconsistent with at least one of the plurality of rules, displaying an error message and/or a warning message to a user on the user interface; and in response to determining that the edited first portion is consistent with the plurality of rules, updating the status associated with the edited first portion to the active mode status.

2. The non-transitory computer-readable media of claim 1, wherein the error message is displayed when the at least one of the plurality of rules concerns only the first portion itself and can be corrected by editing the first portion.

3. The non-transitory computer-readable media of claim 1, wherein the warning message is displayed when the at least one of the plurality of rules concerns the first portion with respect to the tree-like hierarchy structure and cannot be corrected by editing the first portion.

4. The non-transitory computer-readable media of claim 1, further comprising:

performing a second validation process on the entirety of the tree-like hierarchy structure without the modification using an unmodified first portion;

comparing the first validation process and the second validation process; and updating the status associated with the edited first portion to an active mode status when the first validation process and the second validation process have a same number of errors.

5. The non-transitory computer-readable media of claim 1, further comprising:

if at least one error message is displayed, further modifying the edited first portion to create a corrected first portion;

executing a second validation process on the corrected first portion to determine if the corrected first portion is consistent with the plurality of rules of the tree-like hierarchy structure; and updating a status associated with the corrected first portion to an active status if only one or more warning messages are displayed.

6. A method for partial validation of a tree-like hierarchy structure, the method comprising:

selecting a first portion of the tree-like hierarchy structure to edit, wherein a status of an entirety of the tree-like hierarchy structure having multiple levels storing organizational data is in an active mode status that does not allow inconsistent data;

updating a status associated with the first portion to a draft mode status that allows inconsistent data, without placing the entirety of the tree-like hierarchy structure in the draft mode status;

displaying a status indicator for the status of the first portion of the tree-like hierarchy structure in a user interface, the status indicator showing which parts of the tree-like hierarchy structure are in the draft mode status or in the active mode status;

modifying the first portion to create an edited first portion in a draft mode;

executing a first validation process on the edited first portion to determine if the edited first portion is consistent with a plurality of rules of the tree-like hierarchy structure;

in response to determining that the edited first portion is inconsistent with at least one of the plurality of rules, displaying an error message and/or a warning message to a user on the user interface; and in response to determining that the edited first portion is consistent with the plurality of rules, updating the status associated with the edited first portion to the active mode status.

7. The method of claim 6, wherein the error message is displayed when the at least one of the plurality of rules concerns only the first portion itself and can be corrected by editing the first portion.

8. The method of claim 6, wherein the warning message is displayed when the at least one of the plurality of rules concerns the first portion with respect to the tree-like hierarchy structure and cannot be corrected by editing the first portion.

9. The method of claim 6, further comprising:

performing a second validation process on the entirety of the tree-like hierarchy structure without the modification using an unmodified first portion;

comparing the first validation process and the second validation process; and updating the status associated with the edited first portion to an active mode status when the first validation process and the second validation process have a same number of errors.

10. The method of claim 6, further comprising:

if at least one error message is displayed, further modifying the edited first portion to create a corrected first portion;

executing a second validation process on the corrected first portion to determine if the corrected first portion is consistent with the plurality of rules of the tree-like hierarchy structure; and updating a status associated with the corrected first portion if only one or more warning messages are displayed.

11. A system for partial validation of a tree-like hierarchy structure, the system comprising:

at least one processor; and at least one non-transitory memory storing computer executable instructions that when executed by the at least one processor cause the system to carry out actions comprising:

selecting a first portion of the tree-like hierarchy structure to edit, wherein a status of an entirety of the tree-like hierarchy structure having multiple levels storing organizational data is in an active mode status that does not allow inconsistent data;

updating a status associated with the first portion to a draft mode status that allows inconsistent data, without placing the entirety of the tree-like hierarchy structure in the draft mode status;

displaying a status indicator for the status of the first portion of the tree-like hierarchy structure in a user interface, the status indicator showing which parts of the tree-like hierarchy structure are in the draft mode status or in the active mode status;

modifying the first portion to create an edited first portion in a draft mode;

executing a first validation process on the edited first portion to determine if the edited first portion is consistent with a plurality of rules of the tree-like hierarchy structure;

in response to determining that the edited first portion is inconsistent with at least one of the plurality of rules, displaying an error message and/or a warning message to a user on the user interface; and in response to determining that the edited first portion is consistent with the plurality of rules, updating the status associated with the edited first portion to the active mode status.

12. The system of claim 11, wherein the error message is displayed when the at least one of the plurality of rules concerns only the first portion itself and can be corrected by editing the first portion.

13. The system of claim 11, wherein the warning message is displayed when the at least one of the plurality of rules concerns the first portion with respect to the tree-like hierarchy structure and cannot be corrected by editing the first portion.

14. The system of claim 11, further comprising:

performing a second validation process on the entirety of the tree-like hierarchy structure without the modification using an unmodified first portion;

comparing the first validation process and the second validation process; and updating the status associated with the edited first portion to an active mode status when the first validation process and the second validation process have a same number of errors.

15. The system of claim 11, wherein if at least one error message is displayed, further modifying the edited first portion to create a corrected first portion;

executing a second validation process on the corrected first portion to determine if the corrected first portion is consistent with the plurality of rules of the tree-like hierarchy structure; and updating a status associated with the corrected first portion to an active mode status if only one or more warning messages are displayed.

* * * * *